United States Patent

[11] 3,586,765

[72] Inventor Howard F. Jirka
Riverside, Ill.

[21] Appl. No. 837,022
[22] Filed June 27, 1969
[45] Patented June 22, 1971
[73] Assignee Zenith Radio Corporation
Chicago, Ill.

[54] CHROMA AMPLIFIER FOR A COLOR RECEIVER
17 Claims, 3 Drawing Figs.

[52] U.S. Cl. .......................................................... 178/5.4
[51] Int. Cl. .......................................................... H04n 9/48
[50] Field of Search ............................................ 178/5.4, 5.4 CK, 5.4 AC; 330/30, 69

[56] References Cited

UNITED STATES PATENTS 3,435,362 3/1969 Pamlenyi ...................... 330/69
3,522,548 8/1970 Heuner et al. ................ 330/30

*Primary Examiner*—Richard Murray
*Attorney*—Francis W. Crotty

ABSTRACT: A chroma amplifier and color killer has three transistor devices arranged in a Y-type circuit with two of the devices defining a cascode amplifier while the three collectively define a differential amplifier. Another cluster of similar devices define a second cascode amplifier which is in cascade with the first and further define a second differential amplifier. The chroma signal is amplified in both cascode amplifiers for delivery to the color demodulator.

A color killer connects between the two differential amplifiers and has a threshold which is exceeded when the gain of the first cascode amplifier is above a particular value. Upon such occurrence, the color killer disables the second differential amplifier to interrupt translation of the chroma signal.

Inventor
Howard F. Jirka
By
Attorney

Inventor
Howard F. Jirka
By Francis W. Crotty
Attorney

CHROMA AMPLIFIER FOR A COLOR RECEIVER

BACKGROUND OF THE INVENTION

The present invention is directed to the chrominance amplifier, for convenience hereafter referred to as a "chroma" amplifier, of a color receiver. It is concerned most particularly with a structured that lends itself especially well to microcircuitry viewed, not only from the standpoint of its own fabrication, but also its ability to complement microcircuit forms of other major components of the chroma system such as the color demodulator and reference-signal oscillator.

It is, of course, well understood that in accordance with current transmission standards of the Federal Communications Commission, a color broadcast has luminance or brightness information as amplitude modulation of a main carrier and further has chroma or information concerning the hue and saturation of the image as phase- and amplitude-modulation of a 3.58 MHz subcarrier component transmitted along with the main carrier. Demodulation of the luminance information is readily accomplished with the use of any conventional amplitude modulation video detector, whereas demodulation of the chroma information requires some form of synchronous detector for obtaining the three color control signals necessary for application to the three gun shadow-mask type of cathode-ray color image reproducer that is used most generally today. Accordingly, the chroma system of a color receiver is rather complex and has, as major components, a color demodulator, a subcarrier regenerator or reference-signal oscillator for developing a demodulation signal, and stages of chroma amplification preferably having gain control to the end that the chroma signal, as applied to the color demodulator, is substantially of constant amplitude.

A highly attractive form of color demodulator is the subject of application Ser. No. 629,764, filed Apr. 10, 1967, in the name of John L. Rennick. In yet another application Ser. No. 777,760, filed Nov. 21, 1968, likewise filed in the name of John L. Rennick, there is described a novel subcarrier regenerator as well as detector arrangements for developing control potentials required by the functions of automatic phase control and automatic chroma control. Automatic phase control is regulation of the subcarrier regenerator to maintain phase synchronism with e subcarrier component of the color cast while automatic chroma control (ACC) is the function of controlling gain in a chroma system to maintain essentially constant amplitude of the chroma signal as applied to the color demodulator in spite of intensity variations that may be exhibited by the received subcarrier component of the color broadcast. The arrangements of these applications are attractive because, among other things, they are readily constructed in integrated circuit form and, in particular, are conveniently fabricated as monolithic structures with a minimum of circuit elements coupled externally of the monolithic chip or wafer.

This leaves the chroma amplifier as the remaining major component desired to be developed in microcircuit form to complement the demodulator and subcarrier regenerator arrangements of the aforeidentified applications to complete almost the entirety of the chroma system in microcircuit form. The present invention achieves that end and, moreover, permits unicontrol of contrast and color saturation in such a receiver which is highly desirable because it reduces the complexity of consumer adjustment.

Another feature of a chroma system to be described is the color-killer function. This is a well understood and desirable feature of a color receiver which, in effect, disables the chroma channel during the reception of monochrome signals or during operating intervals when the received color broadcast is not adequate to provide satisfactory image reproduction in simulated natural color.

Accordingly, it is an object of the invention to provide an improved chroma amplifier and color-killer system for a color television receiver.

It is another particular object of the invention to provide such a system which is suitable for microcircuit construction of the monolithic, thin film or thick film type.

It is a specific object of the invention to arrange such a system not only for microcircuit fabrication but also for cooperation with microcircuit demodulators and subcarrier arrangements to the end that most of the chroma arrangement is of miniaturized form.

It is another and specific object of the invention to provide a chroma amplifier of the type under consideration which exhibits an essentially linear gain versus control potential characteristic to facilitate unicontrol of contrast and color saturation in the receiver

SUMMARY OF THE INVENTION

The chroma amplifier and color-killer system of the invention utilizes the received chroma carrier signal and also a gain control signal having amplitude variations which represent intensity variation so the chroma signal. The system comprises a cluster of three signal translating devices, such as three element transistors, arranged in a Y-type circuit configuration to define a cascode amplifier including one of the devices connected in cascode with one of the remaining two devices and further to define a differential amplifier in which the aforesaid one device is included in the signal path of both of the remaining two devices. A second chroma amplifier is coupled in cascade with the cascode amplifier and has a control circuit that may respond to an applied killer signal for effectively disabling the second chroma amplifier. Means are included in applying the chroma signal to the cascode amplifier and for deriving an amplified signal from the second chroma amplifier. There are other means for applying the gain control signal to one of the aforesaid two remaining devices of the cluster to control amplification of the chroma signal. A color-killer system is provided, having an input and an output, and responsive to a control potential applied to its input and exceeding a threshold level for developing a killer signal at its output. The input of the color killer connects to one of the aforesaid remaining two devices of the differential amplifier to receive a control potential exceeding its threshold level during operating intervals when the gain of the cascode amplifier exceeds a preselected value. The output of the color killer connects to the control circuit of the second chroma amplifier to interrupt translation of the chroma signal during such operating intervals.

In a preferred form, the second chroma amplifier has a generally similar cluster of three signal translating devices arranged in a Y-type circuit configuration also to define a cascode amplifier and a differential amplifier. This second cluster of devices, however, is further characterized by feedback or its equivalent so that the second chroma amplifier has the desired linear gain control characteristic which facilitates unicontrol of color saturation and contrast in the receiver.

In the extreme embodiment, with complete feedback, one of the devices of the second cluster which is excluded from the cascode amplifier defined by that cluster takes the form of a two electrode device, such as a semiconductor diode.

In a preferred form of the first cluster of devices, three element transistors are employed with the collector-emitter circuit of one common to the collector-emitter paths of the remaining two. One of those remaining two devices is included in the cascode amplifier which is arranged to develop an output which consists essentially only of the chroma signal. The output of the remainder of those two devices, however, consists essentially only of an amplification of the gain control potential, generally a DC potential, applied to the differential amplifier defined by this cluster and it is this output that is utilized to trigger the killer circuit.

BRIEF DESCRIPTION OF THE DRAWINGS

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

DESCRIPTION OF THE PREFERRED EMBODIMENT

Figure 1:
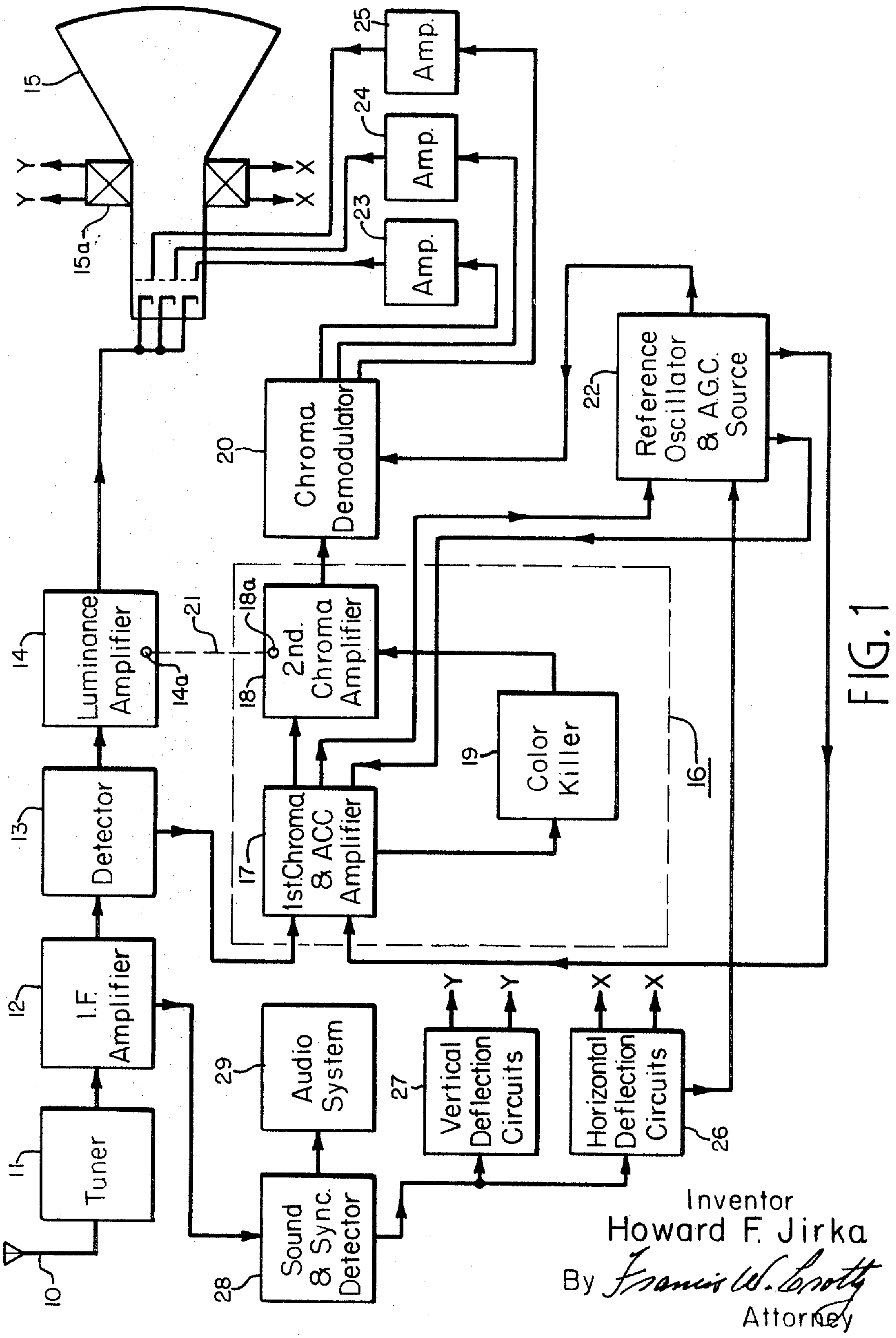
FIG. 1 is a schematic representation of a color television receiver embodying a chroma amplifier and color-killer system that may be constructed in accordance with the subject invention.

The color receiver of FIG. 1 has an antenna 10 coupled in conventional manner to a turner 11 which includes the usual radiofrequency amplifying and heterodyning stages for selecting a desired program signal and for translating that signal to an appropriate intermediate frequency. After amplification in an intermediate-frequency amplifier 12, this signal is applied to a luminance and chroma detector 13 where the luminance, or Y, component of the program signal is derived for application to a luminance amplifier 14. Following amplification therein, the luminance signal is applied to the three cathodes of a conventional shadow mask type of three-gun cathode-ray color image reproducer 15.

The chroma component of the program signal derived in detector 13 includes a phase- and amplitude-modulated subcarrier and also a periodically recurring synchronizing signal in the form of a burst of energy at the frequency of the chroma subcarrier. This chroma component is delivered to a chroma amplifier and color-killer arrangement 16 which comprises a first chroma and ACC amplifier 17 connected in cascade to a second chroma amplifier 18. The output of the chroma amplifier is supplied to a chroma demodulator 20. A color killer 19 is also included within unit 16 and arranged to be triggered by the ACC section of amplifier 17 to interrupt signal translation in chroma amplifier 18. The amplifying stages of unit 16 are controllable as to gain to afford a desired adjustment of chroma amplification.

It is desirable that the chroma signal be supplied to demodulator 20 with fixed amplitude and, therefore, first chroma amplifier 17 responds to a gain control signal to accomplish automatic chroma control so that the chroma input to the color demodulator is substantially constant in amplitude in spite of intensity variations that the received program signal may suffer. Second chroma amplifier 18 is likewise controllable as to gain by means of a color saturation control or potentiometer, shown schematically at 18*a* the broken-construction line 21 extending between color saturation control 18*a* and a contrast control 14*a* of luminance amplifier 14 denotes that these two adjustments may be unicontrolled. This is s convenience for the customer which minimizes the controls to be manipulated in the operation of the receiver and is made practicable in large measure because amplifier 18 exhibits an essentially linear gain versus control potential characteristic. The details of unit 16 will be discussed hereafter.

In order to derive the phase and amplitude modulation of the chroma subcarrier, it is necessary to concurrently supply to chroma demodulator 20 a demodulation or reference signal which is frequency and phase-locked to the burst sync component of the received program signal. The reference signal is developed in a signal source 22 and is applied to demodulator 20. Source 22 usually comprises a crystal controlled oscillator having a nominal frequency corresponding to the frequency of the chroma subcarrier and also an APC arrangement which compares a sync burst of the chroma signal delivered to unit 22 from amplifier 17 with the locally generated oscillations to establish and preserve the necessary locked phase relation of these signals. Additionally, source 22 includes a detector which develops a gain control signal having amplitude variations that represent intensity variations of the chroma subcarrier. Preferably, that detector develops at a pair of output terminals a gain control potential in differential form for application to chroma amplifier 17 as will be explained hereafter. Typically, in a differential gain control system, two control potentials varies in opposite senses in response to a given intensity change in the signal under observation. By way of illustration, should the chroma signal increase in amplitude, the control potential at one output terminal of source 22 increases and the gain control potential at the other terminal decreases in a like amount. The response of chroma amplifier 17 is to decrease the gain as required to maintain the amplified chroma signal of essentially constant amplitude.

It is preferred that demodulator 20 and source 22 be constructed of integrated circuit form in the manner described in the above-identified copending applications with which unit 16 is particularly suited to cooperate.

The function of demodulator 20 is to derive color control signals for application to image reproducer 15. It is, of course, well known that the signal processing may develop the so-called RGB signals for application to the picture tube in order to modulate its three electron beams or alternatively, and as indicated in the arrangement of FIG. 1, color-difference signals of the form R–Y, B–Y and G–Y, may be developed in demodulator 20 for application through respective amplifiers 23, 24 and 25 to the control electrodes of the three gun cluster of tube 15. In this case, internal matrixing of the luminance and color-difference signals takes place to the end that the beams receive the modulation required to synthesize an image in simulated natural color as these beams are caused to repetitively scan an image field or raster on the screen of tube 15.

Scanning of the electron beams is under the control of the usual horizontal and vertical deflection circuits 26 and 27, respectively, which are appropriately timed or synchronized to the transmission by the line- and field-synchronizing components of the program signal. These components are developed in one output of a sound and sync detector 28 which receives the program signal from IF amplifier 12. The deflection circuits connect with the usual deflection yoke 15*a* of the picture tube as indicated by the connection points X–X and Y–Y. It will also be observed there is a connection from the horizontal deflection circuits to signal source 22 because the detectors thereof, employed to develop control potentials, generally utilize a signal component at the line-scanning frequency. For example, this facilitates confining the response of the phase detector to only those moments when a sync burst is present for comparing with the phase of the locally generated subcarrier or reference signal.

The sound or audio portion of the broadcast is likewise derived in detector 28 and utilized in an audio system 29 in the usual fashion.

As thus far described, except for the specific arrangement of chroma amplifier and color killer 16, the receiver is very conventional and responds in well-known manner to a selected color broadcast signal to produce a color image on the screen of image reproducer 15. It is not necessary further to develop the general structure or operation of this receiver. Of course, convergence circuitry will be included to make certain that the electron beams are in proper registry at all points of the scanning raster of tube 15 but, here again, the arrangement is well known and has been omitted to simplify the drawing particularly since it constitutes no part of the present invention.

More particular attention will now be directed to the circuitry of the chroma amplifier and color-killer system 16. The circuit is shown schematically in FIG. 2 and in this representation, the broken-construction line 30 denotes the area or outline of an integrated circuit. All components enclosed within that outline are constituent parts of the integrated circuit whereas components excluded from the enclosure of the broken-line construction are outboarded or external components connected in circuit arrangement with the internal circuitry of the integrated structure.

This chroma amplifier and color-killer system provides amplification of the chroma subcarrier signal and utilizes the differential gain control signal developed in source 22 with amplitude variations reflecting intensity variation so the chroma signal. The system comprises a first chroma amplifier 17 comprising a first cluster of three signal translating devices 31, 32 and 33, individually shown as three electrode transistors, arranged in a Y-type circuit configuration to define a cascode-type of chroma amplifier including one of those devices, specifically transistor 33, connected in cascode with one of the remaining two devices, namely, transistor 32. The cascode arrangement is attractive because of its intrinsic AC stability. The circuit configuration further defines an ACC differential amplifier in which transistor 33 is included in the signal paths of both of the remaining transistors 31 and 32. The emitters of transistors 31 and 32 connect together and are connected to ground through the collector-emitter path of transistor 33 and a resistor 34. The collector of transistor 32 connects to a regulated 24 volt potential supply through a load resistor 35, while the collector of transistor 31 connects to a source of positive voltage $V_{cc}$ through a fixed resistor 36 and through a color-killer adjustment in the form of a variable resistor 37. The collector of transistor 31 is also connected to ground through a resistor 38 and through a chroma signal bypass capacitor 39. A diode 40 connects between a 16 volt bus and the collector of transistor 31 to serve a clamping function, preventing the potential at the collector of this transistor from dropping to a point that could result in saturation. Saturation could, in the absence of clamping diode 40, be encountered in the presence of an unusually strong chroma signal since the ACC function to be described hereafter tends to drive transistor 31 toward saturation under such circumstances which, of course, would destroy the ACC function. Clamping diode 40 clamps the collector potential to a minimum level of approximately 16 volts.

In the described circuit configuration of transistors 31–33, transistor 33 may be considered a constant current source and the current which it supplies is shared by transistors 31 and 32 in the fashion of a differential amplifier with one or the other of transistors 31 and 32 receiving more or less of the current depending upon the differential gain of these devices as established by the ACC gain control potential applied to their base electrodes in a manner to be described. To utilize this network as a chroma amplifier, constant current source 33 is, in effect, modulated with the chroma subcarrier as indicated by the connection to its base from detector 13, this connection serving as means for applying the chroma signal to the amplifier. The base of transistor 33 is also returned to a source of bias potential through a resistor 41.

The ACC gain control potential for determining the relative gains of transistors 31 and 32 is derived, as stated above, from source 22 which presents at two of its terminals a differential form of control potential. Connections indicated in FIG. 2 extending from these terminals to the base electrodes of transistors 31 and 32 serve as means for applying the ACC control signal to these transistors to control the amplification of the chroma signal. Included in those connections are two emitter followers 42 and 43 having emitter resistors 44 and 45. The junction of each such emitter and its resistor connects to the base of the associated one of transistors 31 and 32. The emitter followers serve the normal function of increasing the effective input impedance of transistors 31 and 32 while lowering the base circuit impedance thereof for improved AC stability. The collectors of transistors 42 and 43 connect with the regulated 16 volt bus and the emitter circuit of each is completed through the collector-emitter path of transistor 33.

As thus far described, the first chroma amplifier is a cascode arrangement of transistors 33 and 32 and, additionally a differential amplifier involving all three transistors 31–33. The cascode amplifier receives and amplifiers the chroma signal in an amount determined by the differential of the ACC gain control voltage applied to the bases of transistors 31 and 32. A distinct advantage of the differential connection of the chroma gain control potential is the rejection of and therefore freedom from common mode variations of that potential. The differential amplifier amplifies the ACC gain-control signal for a purpose to be described hereafter.

Further amplification of the chroma signal is attained in a second amplifier 18 coupled in cascade with the cascode amplifier 33, 32. This second amplifier has a similar Y-type circuit configuration, defining both a second cascode amplifier and a second differential amplifier. The devices constituting this second cluster differ from those of the first only in that one is a two-element device and, structurally, may be a diode or even a triode with the base and collector interconnected. Accordingly, the second cluster is shown as comprised of a diode or two-element device 50, a first triode transistor 51 and a second triode transistor 52. Collectively, these three devices define a type of differential amplifier while transistors 52 and 51 together constitute a cascode amplifier. The emitter electrodes of devices 50 and 51 connect together and connect to ground through the collector-emitter circuit of transistor 52 and an emitter resistor 53. The base of transistor 52 connects to the bias source through a resistor 54; the base of transistor 51 connects directly with the 16 volt bus; and the collector thereof connects to the 24 volt bus through a load resistor 55. The base of diode 50 is bypassed to ground for the chroma signal by a capacitor 56 and is connected to a positive voltage source $V_{cc}$ through the series arrangement of a resistor 57 and a color saturation control 58, corresponding to control **18*a* of FIG. 1. The biasing network of diode 50 further includes a resistor 59 connected between the junction of resistor 57 and diode 50** to the 24 volt bus.

The cascode amplifier including transistors 33, 32 of the first-mentioned cluster is connected in cascade with the cascode amplifier 52, 51 of the last-described cluster, their coupling being through an emitter follower 60 having a connection from its base to the collector of transistor 32. The collector of transistor 60 connects with the 24 volt bus while its emitter is connected to ground through resistors 61, 62. A coupling capacitor 63 connects the junction of resistors 61, 62 to the base of transistor 52. The last-described connection, including emitter follower 60, comprises means for deriving essentially only the amplified chroma signal from the first cascode amplifier and for delivering it to the second cascode amplifier for further amplification. In similar fashion, an emitter follower, comprising a transistor 65, derives the amplified chroma signal from the output of cascode amplifier 52, 51 for application to chroma demodulator 20. For this purpose, the base of transistor 65 connects to the collector of transistor 51 and its emitter is connected to ground through resistors 66, 67. The takeoff to the demodulator is from the junction of these resistors as indicated.

It is advantageous to employ AC coupling of cascode amplifiers 33, 32 and 52, 51 as described because it isolates cascode amplifier 52, 51 from variations in DC levels of amplifier 17 that inevitably result from the application of ACC gain potential to that amplifier.

Figures 2, 3:
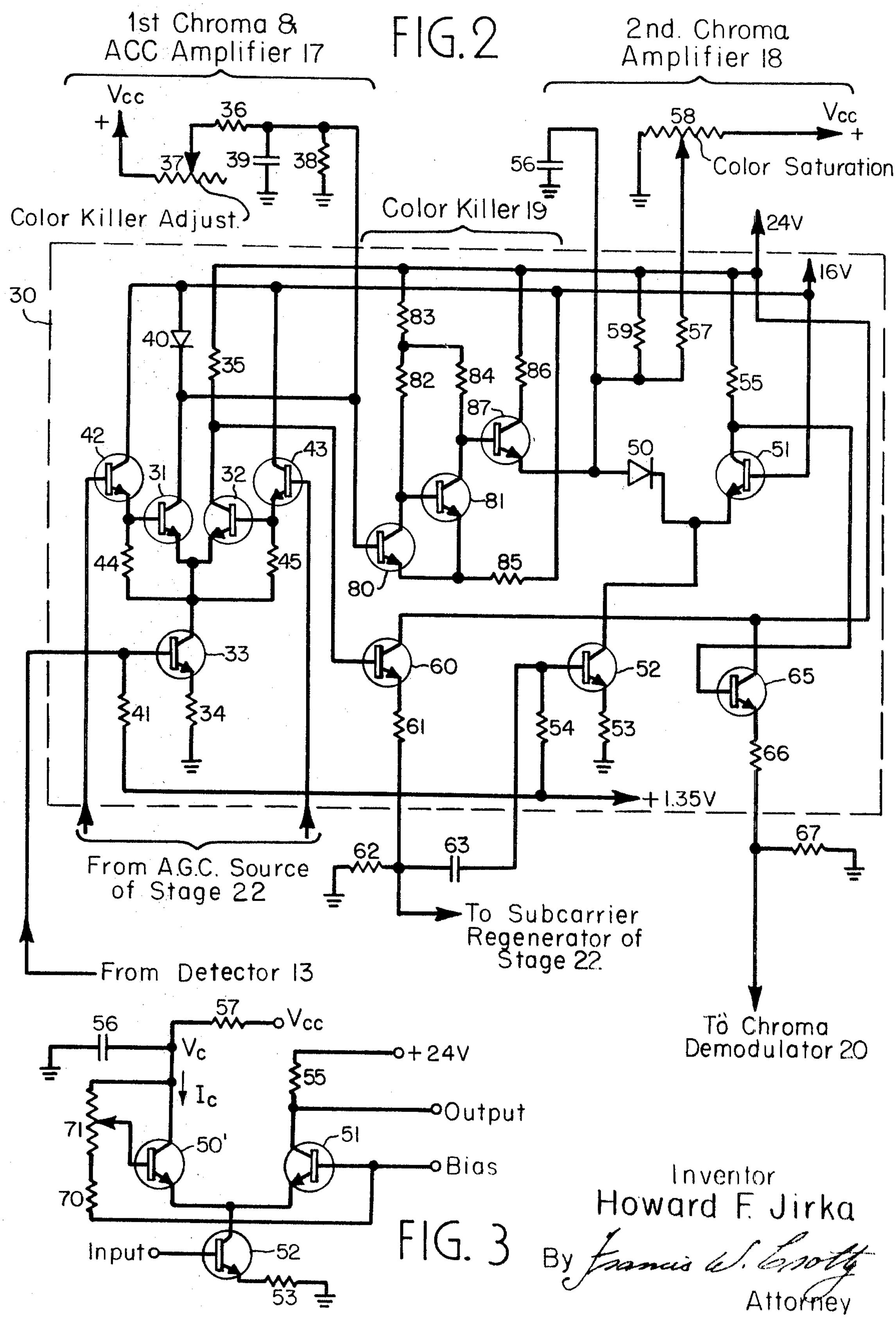
FIG. 2 represents the circuitry of such a chroma amplifier and color-killer system.
FIG. 3 is a circuit representation of a form of differential amplifier utilized in explaining a principle of the present invention.

As stated earlier, it is convenient to supply the chroma signal to signal source 22 through the first chroma/amplifier 17 and in the circuit arrangement of FIG. 2 such a connection is taken at the junction of resistor 62 and capacitor 63.

To this point, consideration has been confined principally to the stages of amplification of the chroma amplifier and color-killer system 16. There are two such stages which are generally similar to one another, serving in the capacity of a differential amplifier with respect to a gain control potential and further serving as two cascade amplifiers of the cascode type with respect to the chroma signal. The nature of the gain control potentials of these two states are, however, different. For the first stage, the control potential is applied differentially to achieve automatic chroma control, that is to say, substantially constant intensity of the chroma signal is applied to demodulator 20 even though the received program signal may have intensity variations. The second stage is operated in a reverse gain control mode with the gain control a customer adjustment referred to as a color saturation control and, as indicated in FIG. 1, it is unicontrolled with the contrast control. Unicontrol of these adjustments provides optimum performance if the chroma amplifier including the color saturation control exhibits a substantially linear gain versus control voltage characteristic. But a differential amplifier is a nonlinear device, causing unicontrol of the color-saturation adjustment when included in a differential amplifier and the contrast control to be of questionable validity. This is overcome in the described arrangement which is unique in using two-element device 50 as one of the cluster of three signal translating devices of the differential amplifier. It is found to exhibit the desired linear gain characteristic.

It is, of course, not necessary to make use of a diode as one member of the cluster 50–52; it is necessary, however, to introduce feedback for the differential amplifier defined by that cluster but not for its cascode amplifier. The differential amplifier arrangement 50–52 of FIG. 2 developed from the circuit approach represented in FIG. 3 where the cluster includes a triode transistor 50′ as well as the other triodes 51 and 52. The base electrodes of transistors 50′ and 51 are connected together through a resistor 70 and are further connected to a bias source. Notice the feedback connection provided by resistor 71 connected between the collector of transistor 50′ and a tap leading to the base of that transistor. This is a direct current inverse voltage feedback at the base of the transistor. Ideally, the collector potential $V_c$ of transistor 50′ in this feedback arrangement will remain constant and the collector current as well as the gain of the transistor will be in accordance with the following relation:

$$I_{c50} = (V_{cc} - V_c)/R_{57}$$

This relation is a linear function of $V_{cc}$ and if the tap on resistor 71 is raised to increase the amount of feedback, in the limit it will connect with the collector of transistor 50′. At that juncture, device 50′ is the equivalent of a diode in an arrangement as indicated in FIG. 2. The table of illustrative circuit constants, set forth hereafter as a further particularization of an illustrative embodiment of the invention, provides the proportioning of the resistive network 57–59 associated with diode 50 for acceptable performance of the receiver with unicontrolled operation of contrast control 14*14* and color-saturation control 18*a*.

The color killing function of the chroma amplifier and color-killer system is provided by a circuit arrangement having an input and an output and responsive to a control potential applied to its input and exceeding a threshold level for developing a killer signal at its output. A suitable form of killer circuit is a Schmitt trigger comprising transistors 80 and 81. The base of transistor 80 connects with color-killer adjustment 37 and its collector connects to the 24 volt bus through resistors 82 and 83. The collector of transistor 81 connects through a resistor 84 to the junction of resistors 82 and 83. As typical of the Schmitt trigger, the collector of transistor 80 connects to the base of transistor 81 and their emitters are tied together and returned to the 16 volt bus through a resistor 85. The output of transistor 81 is applied to diode 50 in a sense to increase diode conduction. This is accomplished through a transistor 87 having a base connected to the collector of transistor 81, having a collector connected to a 24 -volt bus through a resistor 86 and having an emitter connected to diode 50 much in the nature of an emitter follower circuit.

The operating potentials of the Schmitt circuit, in particular the base potential of transistor 80 determined by adjustment of color-killer control 37, cause transistor volt to be cut off and transistor 81 to be in saturation during normal color reception. In this operating condition transistor 87 is cut off and the killer circuit has no material effect on conduction in diode 50 of the cluster 50–52. The DC coupling from the collector of transistor 31 to the base of transistor 80 constitutes means for deriving an essentially DC output signal from transistor 31 which is an amplification of the ACC potential applied to the base of transistor 31. So long as the chroma amplifier system is functioning properly, transistor 80 remains cut off, no ACC potential is applied to diode 50 and the relative conduction of devices 50, 51 and the gain exhibited by the cluster 50–52 is determined by the setting of color-saturation control 58. As a consequence, the chroma signal is amplified with ACC controlled gain in first amplifier 17 and is amplified with a manually adjusted gain in second amplifier 18 is conventional manner.

During abnormal operating conditions when the chroma signal is either not present or its intensity is at least 20 db. down from an acceptable average or reference level, the ACC gain control potential applied to transistors 31 and 32 of first chroma amplifier 17 from source 22 decreases conduction in transistor 31 and increases conduction in transistor 32. Ultimately, the voltage at the collector of transistor 31 increases to a value which exceeds the upper limit of normal operating conditions and the threshold or triggering level of Schmitt circuit 80, 81. When this point has been reached, the base of collector 80 rises in potential sufficiently that it is no longer reverse biased and conduction commences. This causes its collector voltage to decrease changing the potential at the base of transistor 81 in a direction to reduce its conductivity. By virtue of the common emitter resistor 85, this further increases conduction in transistor 80 to the end that transistor 80 is quickly driven into saturation while transistor 81 is cut off. These conditions remain so long as the potential level at the collector of transistor 31, which was high enough to initiate the change in conductivity, retains it abnormally high value. As transistor 81 is driven to cutoff, its collector potential rises and transistor becomes conductive to increase conduction in diode 50 to the extent that all of the current supplied by transistor 52 is taken by diode 50 and transistor 51 of the cascode circuit is rendered nonconductive, interrupting translation of the chroma signal through the chroma amplifier. Accordingly, color-killer circuit 19 disables the chroma system in the presence of abnormal operating conditions when it is inappropriate to have the chroma system functioning. As soon as the abnormality ceases and normal conditions are restored, the conductive states of transistors 80, 81 and 87 are restored to normal automatically and the chroma system resumes its normal operation.

In one practical embodiment of the arrangement of FIG. 2 all of the elements enclosed within broken line rectangle 30 are included in a single monolithic structure having a common substrate and encapsulated in the usual fashion. All of the transistor devices are of the NPN type and have closely matched characteristics. The monolithic structure is formed essentially only of such transistors plus diodes and resistors, the latter having values that are readily constructed with acceptable tolerances in normal monolithic fabricating procedures. The monolithic device, considered along with the external components in circuit connection therewith, is uniquely attractive for microelectric structure in that no inductors are required and the number of capacitors is minimized. Representative values of the parameters of one practical embodiment of the circuit arrangement of FIG. 2 are set forth in the following table:

| | |
|---|---|
| Resistor 34 | 220 ohms |
| Resistor 35 | 3,300 ohms |
| Resistor 36 | 1,000 ohms |
| Resistor 37 | 10,000 ohms |
| Resistor 38 | 22,000 ohms |
| Resistor 41 | 2,200 ohms |
| Resistor 44 | 1,000 ohms |
| Resistor 45 | 1,000 ohms |
| Resistor 53 | 360 ohms |
| Resistor 54 | 2,200 ohms |
| Resistor 55 | 2,400 ohms |
| Resistor 57 | 10,000 ohms |
| Resistor 58 | 5,000 ohms |
| Resistor 59 | 5,600 ohms |
| Resistor 61 | 36 ohms |
| Resistor 62 | 3,300 ohms |
| Resistor 66 | 36 ohms |
| Resistor 67 | 2,700 ohms |
| Resistor 82 | 10,000 ohms |

| | |
|---|---|
| Resistor 83 | 5,600 ohms |
| Resistor 84 | 2,700 ohms |
| Resistor 85 | 500 ohms |
| Resistor 86 | 1,000 ohms |
| Capacitor 39 | 0.05 microfarads |
| Capacitor 56 | 0.05 microfarads |
| Capacitor 63 | 220 picofarads |
| $V_{cc}$ | +B supply of the receiver (24 volts) |

It is desirable to arrange the power supply of chroma amplifier and color-killer system 16 so that the internal biases track proportionally any variations in the B+ supply of the receiver. If this precaution is not observed, manual gain control **18*a*** would function properly only from the regulated 24 volt supply. But when the supply voltages are tracked properly, acceptable performance is achieved even though the applied B+ supply may have different regulation from the 24 volt supply.

While particular embodiments of the invention have been shown and described, it will be obvious to those skilled in the art that changes and modifications may be without departing from the invention in its broader aspects, and, therefore, the aim in the appended claims is to cover all such changes and modifications as fall within the true spirit and scope of the invention.

I claim:

1. A chroma amplifier and color-killer system for a color receiver for utilizing a chroma carrier signal modulated with color-image information and for further utilizing a control signal having amplitude variations which represent intensity variations of said chroma signal, which system comprises:

a cluster of three signal translating devices arranged in a Y-type circuit configuration to define a cascode amplifier including one of said devices connected in cascode with one of the remaining two devices and further to define a differential amplifier in which said one device is included in the signal paths of both of said remaining two devices;

a second amplifier coupled in cascade with said cascode amplifier of said cluster and having a control circuit responsive to an applied killer signal for effectively disabling said second amplifier;

means for applying said chroma signal to said cascode amplifier of said cluster and for deriving an amplified chroma signal from said second amplifier;

means for applying said control signal to at least one of said remaining two devices of said cluster to control the amplification of said chroma signal;

a color-killer circuit having an input and an output and responsive to a control potential applied to said input and exceeding a given threshold value for developing a killer signal at said output;

means for connecting the input of said color killer to one of said remaining two devices of said cluster to receive therefrom a control potential exceeding said threshold level during operating intervals when the gain of the cascode amplifier of said cluster exceeds a preselected value;

and means for connecting the output of said color killer to said control circuit of said second amplifier to interrupt translation of said chroma signal during said operating intervals.

2. A chroma amplifier and color-killer system in accordance with claim 1 in which:

said second amplifier is a similar cluster of three signal translating devices arranged in a Y-type circuit configuration to define a second cascode amplifier and a second differential amplifier;

in which the cascode amplifiers of both clusters are connected in-cascade;

and in which said output of said color killer is connected to said second differential amplifier to interrupt signal translation in said second cascode amplifier during said operating intervals.

3. A chroma amplifier and color-killer system in accordance with claim 1 in which:

said control potential is applied differentially to both of said remaining two devices of said cluster of devices.

4. A chroma amplifier and color-killer system in accordance with claim 1 in which:

said input of said color killer is connected to the one of said remaining two devices of said cluster that is not included in said cascode amplifier.

5. A chroma amplifier and color-killer system in accordance with claim 4 in which:

said second amplifier is only AC coupled to said cascode amplifier while said color-killer input is DC coupled to the one of said devices of said cluster that is not included in said cascode amplifier.

6. A chroma amplifier and color-killer system in accordance with claim 1 in which:

said second amplifier has a gain-control circuit including an adjustable color-saturation control for additional control of the amplification of said chroma signal;

and in which said second amplifier has a linear gain-control voltage characteristic.

7. A chroma amplifier and color-killer system in accordance with claim 6 in which:

said second amplifier is a similar cluster of three signal translating devices arranged in a Y-type circuit configuration to define a second cascode amplifier and a second differential amplifier;

in which the cascode amplifiers of both clusters are connected in-cascade;

in which said output of said color killer is connected to said second differential amplifier to interrupt signal translation in said second cascode amplifier during said operating intervals;

and in which said gain-control circuit of said second amplifier includes the one of the remaining two devices of the second cluster of devices that is not included in said second cascode amplifier.

8. A chroma amplifier and color-killer system in accordance with claim 7 in which:

said output of said color killer is connected to the one of said devices of said second cluster that is included in said gain-control circuit.

9. A chroma amplifier and color-killer system in accordance with claim 8 in which:

said input of said color killer is connected to the one of said devices of the first cluster of devices that is not included in said first cascode amplifier.

10. A gain-controlled chroma amplifier for a color receiver for utilizing a chroma carrier signal modulated with color-image information and for further utilizing a gain control signal comprising:

a cluster of three signal translating devices, including one having only two-electrodes and two having at least three-electrodes, arranged in a Y-type circuit configuration to define a cascode amplifier including one of said three-electrode devices and further to define a differential amplifier in which said one three-electrode device is included in the signal paths of both of the remaining devices;

means for applying said chroma signal to said one three-electrode device and for deriving an amplified chroma signal from said other three-electrode device;

and means for applying said gain-control signal to at least one of said devices, other than said one three-electrode device, to control the amplification of said chroma signal.

11. A gain-controlled chroma amplifier in accordance with claim 10 in which:

said gain-control signal is applied to said two-electrode device.

12. A gain-controlled chroma amplifier in accordance with claim 10 in which:

an adjustable color-saturation control develops said gain-control signal;

and in which said color-saturation control is unicontrolled with a contrast control for said color receiver.

13. A gain-controlled chroma amplifier for a color receiver for utilizing a chroma carrier signal modulated with color-image information and for further utilizing a gain control signal comprising:

a cluster of three signal translating devices, individually having input and output electrodes, arranged in a Y-type circuit configuration to define a cascode amplifier including one of said devices connected in cascode with one of the remaining two devices and further to define a differential amplifier in which said one device is included in the signal paths of both of said remaining two devices;

a feedback connection between said input and output electrodes of the other of said remaining two devices to provide feedback for said differential amplifier but not for said cascode amplifier;

means for applying said chroma signal to said one device and for deriving an amplified chroma signal from said one of said remaining two devices;

and means for applying said gain control signal to at least one of said remaining two devices, to control the amplification of said chroma signal.

14. A gain-controlled chroma amplifier in accordance with claim 13 in which:

the parameters of said feedback circuit are proportioned to establish a substantially linear gain versus control signal characteristic for said chroma amplifier.

15. A gain-controlled chroma amplifier for a color receiver for utilizing a chroma carrier signal modulated with color-image information and for further utilizing a gain control signal comprising:

a cluster of three signal translating devices, individually having input and output electrodes, arranged in a Y-type circuit configuration to define a cascode amplifier including one of said devices connected in cascode with one of the remaining two devices and further to define a differential amplifier in which said one device is included in the signal paths of both of said remaining two devices;

means for applying said chroma signal to said one device;

means for applying said gain control signal to at least one of said remaining two devices to control the amplification of said chroma signal;

and means for deriving from said amplifier a first output signal comprising essentially only said chroma signal and a second output signal comprising essentially only said control signal.

16. A gain-controlled chroma amplifier in accordance with claim 15 in which:

said control signal has amplitude variations which represent intensity variations of said chroma signal;

and in which said control signal is applied differentially to said remaining two devices of said cluster.

17. A gain-controlled chroma amplifier in accordance with claim 16 in which:

said chroma output signal is derived from the one of said remaining two devices that is included in said cascode amplifier while said output control signal is derived from the other of said remaining two devices.